No. 801,070. PATENTED OCT. 3, 1905.
F. Q. FOKES.
GUANO DISTRIBUTER.
APPLICATION FILED MAY 3, 1905.
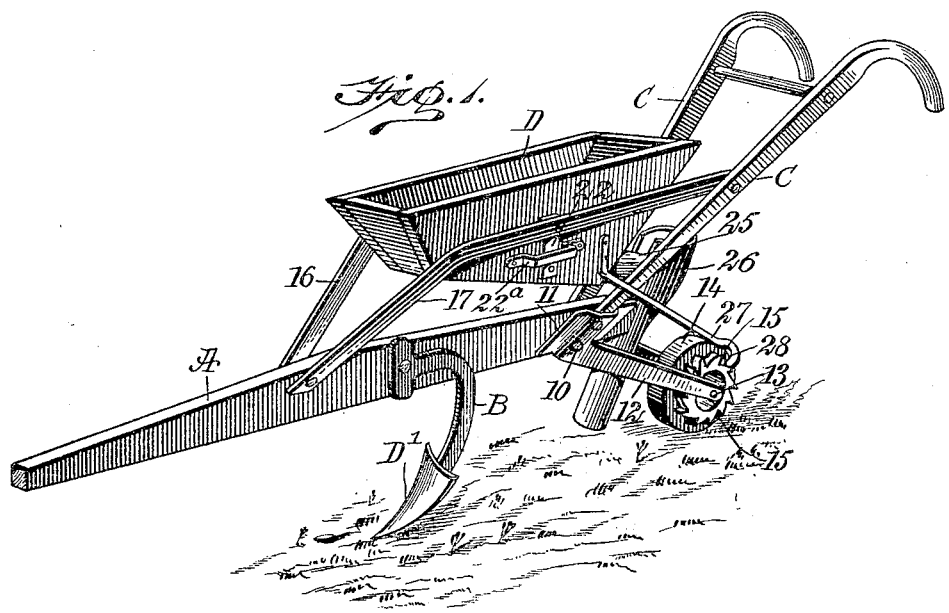
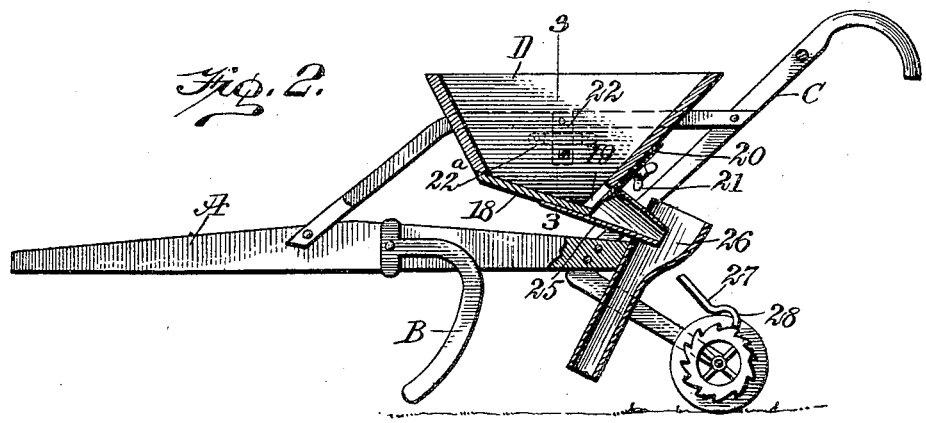
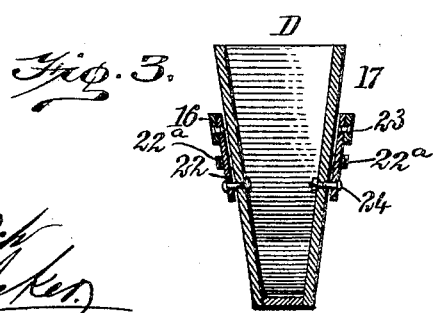
WITNESSES:
INVENTOR
Frank Q. Fokes
BY
ATTORNEYS

UNITED STATES PATENT OFFICE.

FRANK QUINN FOKES, OF MONTEZUMA, GEORGIA.

GUANO-DISTRIBUTER.

No. 801,070.  Specification of Letters Patent.  Patented Oct. 3, 1905.

Application filed May 3, 1905. Serial No. 258,571.

*To all whom it may concern:*

Be it known that I, FRANK QUINN FOKES, a citizen of the United States, and a resident of Montezuma, in the county of Macon and State of Georgia, have invented a new and useful Improvement in Guano-Distributers, of which the following is a full, clear, and exact description.

The purpose of the invention is to construct an attachment to a plow whereby guano or other fertilizer may be distributed in a uniform manner in the furrow as the latter is made, and to so construct the attachment that it will be simple, durable, and economic in action and so that the fertilizing material will be kept in constant agitation while the implement is in action, and so that the extent of the supply can be regulated at will.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved implement. Fig. 2 is a vertical section through portions of the attachment, other portions thereof being shown in side elevation; and Fig. 3 is a transverse section through the hopper of the attachment and its support, the section being taken on the line 3 3 of Fig. 2.

A represents a plow-beam; B, a shank or standard which is attached to the beam in any desired manner. D' represents the share attached to said shank, and C represents the customary handles for the beam A.

The handles are secured to the beam by bolts 10, and these bolts are passed not only through the handle and into the beam but through shoes or sockets 11, which are formed at the forward ends of arms 12, said arms having a downward and rearward inclination extending some distance beyond the rear end of the beam, and the shoes or sockets 11, forming a portion of the inner ends of said arms are made to receive the lower ends of the handles C and engage with the opposite sides of the beam A. The arms 12 converge in direction of their free ends, and between said free ends of the arms 12 the trunnion 13 of a wheel 14 is mounted to turn, and on the said wheel 14 a ratchet-wheel 15 is secured or made integral therewith, as may be desired.

Supporting-bars 16 and 17 are secured at their forward ends on the beam A, preferably forward of the shank B, and these supporting-bars are carried at an inclination upward and rearward and then horizontally to a firm engagement with the handles C.

A hopper D is located between the supporting-bars 16 and 17, and said hopper is pivotally supported in such manner that it will be normally slightly overbalanced in direction of the rear of the implement. The hopper D is provided with front and rear end portions inclined in direction of each other, the rear end portion being of greater length than the forward end portion, and the bottom 18 inclines downward from the front in direction of the rear, and also in the construction of the hopper its sides incline from the top downward and inward. At the rear lower end of the said bottom 18 an opening 19 is produced, through which the fertilizer contained in the hopper is adapted to escape. The amount of fertilizing material thus escaping is regulated through the medium of a gate 20, mounted to slide upon the outer face of the rear end portion of the hopper, and is regulated by means of a thumb-screw 21 or its equivalent.

The manner in which the hopper D is pivoted between the supporting-bars 16 and 17 is as follows: Suspension-arms 22 are carried downward from the supporting-bars 16 and 17, the said suspension-arms being pivotally attached to the said supporting-bars, as is shown at 23 in Fig. 3, and the lower ends of said suspension-arms 22 are pivotally connected with the side portions of the hopper D, as is illustrated at 24 in said Fig. 3.

It is obvious that the hopper hung as described is capable of an up-and-down and of a backward-and-forward movement, and such movement is limited by yokes 22$^a$, secured to the sides of the hopper, which yokes extend across the suspension-arms 22, as is shown in Figs. 1 and 3.

A tube 25 of any desired material is secured to the lower rear portion of the hopper D in such manner as to receive the material which passes out through the outlet-opening 19, and this "delivery-tube" 25, as it may be termed, is made to enter a distributing-tube 26, which is secured to the rear of the beam A and is given more or less of a downward-and-forward inclination, as is illustrated in Figs. 1 and 2. An actuating-arm 27 is secured to one side of the hopper D at the rear of its pivot-point, and this actuating-arm is carried downward and rearward and its lower end is curved forward, being hook-shaped, as shown at 28, which hook-terminal 28 of the actuating-arm 27 engages with the toothed portion of the ratchet-wheel 15, so that as the implement is drawn forward and the wheel 14 is revolved the ratchet-wheel acting on the actuating-arm 27 causes the latter to first swing the hopper forward and then permit the hopper to swing rearward, and the hopper in such movement has practically all the advantages of a vertical movement, as when the actuating-arm 27 is released from one tooth in its passage to the other it drops suddenly, thus jarring the hopper D quite violently, and thereby agitating the material in the hopper and insuring the free delivery of the material therefrom.

Having thus described my invention, I claim as new and desire to secure by Letters Patent—

1. A plow-beam, supporting-bars carried thereby, a hopper pivoted between the said supporting-bars, the hopper being normally overbalanced in direction of its rear end, means for limiting the motion of the hopper with respect to the supporting-bars, a ratchet-wheel carried by the said beam, means for operating the ratchet-wheel as the implement is moved, and an actuating-arm in engagement with the said ratchet-wheel and attached to the said hopper.

2. A plow-beam, supporting-bars secured thereto and extending upward therefrom, bracket-arms pivoted to the supporting-bars, a hopper pivoted to the said bracket-arms, means for limiting the motion of the hopper with respect to the arms, the hopper having inclined front and rear ends and its bottom inclined from the front in direction of the rear, the said hopper being provided with an outlet-opening at its rear lower portion, a distributing-tube attached to the beam, a delivery-tube connected with the hopper and operating in the distributing-tube, a traction-wheel supported from the rear portion of the beam, a ratchet-wheel secured to the said traction-wheel, and an actuating-arm attached to the hopper, being also in engagement with the ratchet-wheel.

3. In an agricultural implements, a plow-beam, a shank attached to the beam adapted to carry a share, supporting-bars extending upward and rearward from the plow-beam, bracket-arms pivoted to the supporting-bars, a hopper located between the supporting-bars, pivotally connected with said bracket-arms so that the hopper is normally overbalanced in direction of its rear, the hopper being provided with end portions inclined in direction of each other, a downwardly and rearwardly inclined bottom and an outlet at its lower rear portion, a gate for the said opening, a distributing-tube attached to the beam, having a downward and forward inclination, a delivery-tube secured to the hopper, said tube being in communication with the distributing-tube, arms attached to the rear portion of the beam, a traction-wheel located between the said arms at the rear of the beam, a ratchet-wheel secured to the traction-wheel, and an actuating-arm secured at one end to the hopper, its other end being in engagement with the said ratchet-wheel, as set forth.

In testimony whereof I have signed my name to this specification in the presence of two subscribing witnesses.

FRANK QUINN FOKES.

Witnesses:
CHAS. B. LEWIS,
A. D. MAXWELL.